US008265832B2

(12) United States Patent
Haller et al.

(10) Patent No.: US 8,265,832 B2
(45) Date of Patent: Sep. 11, 2012

(54) VEHICLE COMPRISING A SPRING-MOUNTED VEHICLE SEAT AND A SPRING-MOUNTED VEHICLE CAB, AND SUSPENSION METHOD

(75) Inventors: Erwin Haller, Birgland (DE); Jens Kolb, Koenigstein (DE)

(73) Assignee: Grammer AG, Amberg (DE)

( * ) Notice: Subject to any disclaimer, the term of this patent is extended or adjusted under 35 U.S.C. 154(b) by 848 days.

(21) Appl. No.: 12/247,887

(22) Filed: Oct. 8, 2008

(65) Prior Publication Data
US 2009/0125194 A1 May 14, 2009

(30) Foreign Application Priority Data

Oct. 8, 2007 (DE) .......................... 10 2007 048 194

(51) Int. Cl.
*B62D 6/06* (2006.01)
*B60G 17/018* (2006.01)
*B62D 33/06* (2006.01)
*B60N 2/50* (2006.01)

(52) U.S. Cl. ..... 701/48; 701/37; 180/89.13; 296/190.07
(58) Field of Classification Search .................... 701/48, 701/37, 38; 180/89.13, 89.12, 89.14; 188/282.4, 188/266.1, 282.3, 266.2; 267/131, 133; 280/5.507, 280/5.515, 5.518, 5.519, 124.157, 5.513, 280/5.517, 5.514; 296/190.07, 35.1, 190.04; 248/550, 631, 636
See application file for complete search history.

(56) References Cited

U.S. PATENT DOCUMENTS

| | | |
|---|---|---|
| 3,466,055 A | 9/1969 | Keijzer |
| 3,762,769 A | 10/1973 | Poschl |
| 3,966,223 A | 6/1976 | Carr |
| 4,023,657 A | 5/1977 | Trzoska |
| 4,193,629 A | 3/1980 | Merkle |
| 4,418,955 A | 12/1983 | Muncke et al. |
| 4,451,079 A | 5/1984 | Takahashi |
| 4,463,839 A | 8/1984 | Ashiba |
| 4,600,215 A | 7/1986 | Kuroki et al. |
| 4,634,142 A | 1/1987 | Woods et al. |
| 4,645,042 A | 2/1987 | Inoue et al. |
| 4,700,971 A | 10/1987 | Doi et al. |

(Continued)

FOREIGN PATENT DOCUMENTS
DE 6800401 3/1969
(Continued)

*Primary Examiner* — Paul N Dickson
*Assistant Examiner* — Karen A Beck
(74) *Attorney, Agent, or Firm* — Lowe Graham Jones PLLC

(57) ABSTRACT

There is described a vehicle comprising a spring-mounted vehicle seat (3; 13) in a spring-mounted vehicle cab (2; 12), wherein the vehicle seat (3; 13) is spring-mounted by means of at least one first spring element (24) and/or one first damping element (25) relative to the vehicle cab (2; 12) in the vehicle height and/or vehicle length and/or vehicle width direction, and the vehicle cab (2; 12) is spring-mounted by means of at least one second spring element (15) and/or second damping element (14) relative to a vehicle frame (11) in the vehicle height and/or vehicle length and/or vehicle width direction, comprising a control device (34) which, as a function of a first measured acceleration value of an excursion of the vehicle frame (11), causes a first application of force for regulating the excursion of the first spring element (24) and/or damping element (25) and a second application of force for regulating the excursion of the second spring element (15) and/or the functional element (14), in mutual dependence on one another. A method for the suspension of such a vehicle is also described.

14 Claims, 3 Drawing Sheets

U.S. PATENT DOCUMENTS

| | | | |
|---|---|---|---|
| 4,726,604 A | 2/1988 | Asami et al. | |
| 4,729,580 A | 3/1988 | Buma et al. | |
| 5,004,206 A | 4/1991 | Anderson | |
| 5,217,210 A | 6/1993 | Schützner | |
| 5,234,203 A | 8/1993 | Smith | |
| 5,255,935 A | 10/1993 | Imani | |
| 5,324,069 A | 6/1994 | Ogawa | |
| 5,425,436 A | 6/1995 | Teramura et al. | |
| 5,428,533 A | 6/1995 | Ogawa | |
| 5,450,322 A | 9/1995 | Tanaka et al. | |
| 5,513,108 A | 4/1996 | Kishimoto et al. | |
| 5,555,501 A | 9/1996 | Furihata et al. | |
| 5,558,398 A | 9/1996 | Santos | |
| 5,603,387 A | 2/1997 | Beard et al. | |
| 5,623,410 A | 4/1997 | Furihata et al. | |
| RE35,572 E | 7/1997 | Lloyd et al. | |
| 5,732,370 A | 3/1998 | Boyle et al. | |
| 5,735,509 A | 4/1998 | Gryp et al. | |
| 5,941,920 A | 8/1999 | Schubert | |
| 6,000,703 A | 12/1999 | Schubert et al. | |
| 6,029,764 A * | 2/2000 | Schubert | 180/89.13 |
| 6,067,491 A | 5/2000 | Takahashi | |
| 6,237,889 B1 | 5/2001 | Bischoff | |
| 6,264,163 B1 | 7/2001 | Ivarsson | |
| 6,314,353 B1 | 11/2001 | Ohsaku et al. | |
| 6,371,456 B1 | 4/2002 | Ritchie et al. | |
| 6,719,258 B2 | 4/2004 | Bryngelson et al. | |
| 6,886,650 B2 | 5/2005 | Bremner | |
| 7,950,726 B2 * | 5/2011 | Brown | 296/190.07 |
| 2003/0015830 A1 | 1/2003 | Miller et al. | |
| 2003/0140487 A1 | 7/2003 | Plettner | |
| 2004/0094912 A1 | 5/2004 | Niwa et al. | |
| 2004/0227050 A1 | 11/2004 | Haller | |
| 2009/0179390 A1 | 7/2009 | Wurmthaler et al. | |
| 2010/0044685 A1 | 2/2010 | Kim et al. | |

FOREIGN PATENT DOCUMENTS

| | | |
|---|---|---|
| DE | 6605170 | 1/1970 |
| DE | 2502627 | 7/1976 |
| DE | 19714576 | 10/1998 |
| DE | 20214583 | 1/2003 |
| DE | 102004013395 | 10/2005 |
| DE | 102004013308 | 12/2005 |
| DE | 102005048961 | 4/2007 |
| EP | 0089794 | 9/1983 |
| EP | 0739766 | 10/1996 |
| EP | 1352595 | 10/2003 |
| EP | 1464866 | 10/2004 |
| EP | 1468870 | 10/2004 |
| EP | 1188608 | 7/2006 |
| EP | 1987970 | 11/2008 |
| GB | 1521520 | 8/1978 |
| JP | 61075008 | 4/1986 |
| JP | 02133215 | 5/1990 |
| JP | 02197470 | 8/1990 |
| JP | 03200485 | 9/1991 |
| WO | 8703256 | 6/1987 |
| WO | 8912766 | 12/1989 |
| WO | 2006134417 | 12/2006 |

* cited by examiner

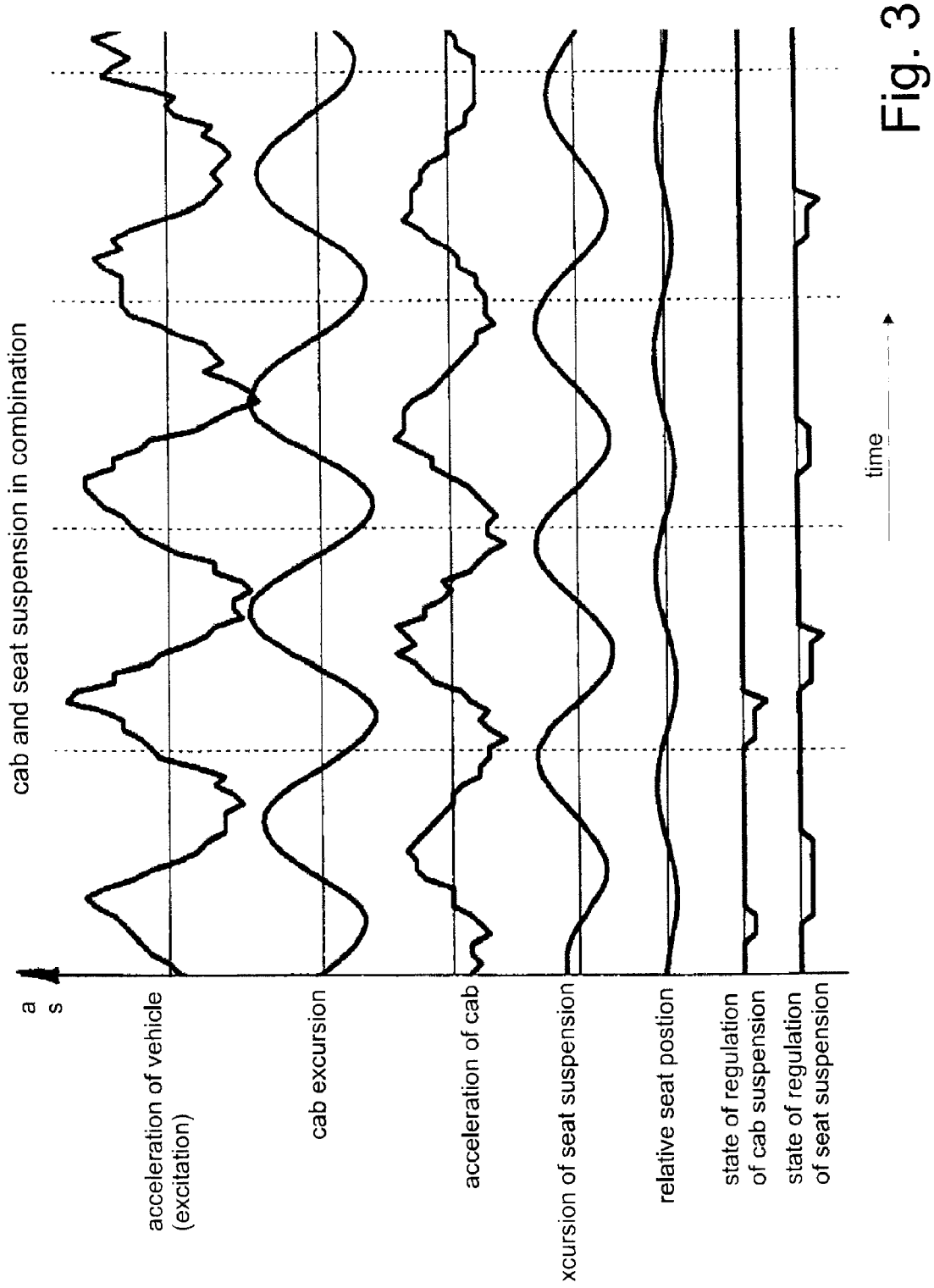

VEHICLE COMPRISING A SPRING-MOUNTED VEHICLE SEAT AND A SPRING-MOUNTED VEHICLE CAB, AND SUSPENSION METHOD

PRIORITY CLAIM

This application claims priority to German Patent Application No. 10 2007 048 194.4 filed on Oct. 8, 2007.

BACKGROUND

Vehicles comprising spring-mounted vehicle seats are known in particular for damping a height excursion of the vehicle seat when travelling over uneven road surfaces, such as potholes. EP 1 188 608 A1 discloses a damping system for spring-mounted vehicle seats, in which a pneumatic load relief device and a hydraulic actuator are arranged between a seat part and a lower part connected to the vehicle, in addition to a mechanical flexible connection device. Both the pneumatic load relief device and the hydraulic actuator are controlled by a control device as a function of a seat error signal, which is generated for example by a sudden height adjustment of the seat part.

Such suspension devices are of simple construction since the actuator, upon receipt of a position error signal relating to the vehicle seat, which is acted upon by the weight of the driver, is supplied with air by means of a compressor and as a result an increased volume of air is provided for sufficiently damping the vehicle seat. Such suspension devices do not have along their height adjustment any comfort range which extends over a relatively long portion of the height adjustment distance, and thus provides a uniform suspension within this height adjustment range with the same restoring forces.

Also known are air springs which have a linearly running force/distance air spring characteristic, the gradient of which differs depending on the design of the air spring and an applied additional volume. Usually with such air springs, constant additional volumes are used which are connected to the expanding and contracting air spring as an actual air volume of the air spring. Such constant additional volumes have the result that, when the air spring is set with a force/distance air spring characteristic having a small gradient, it is not possible for the seat part to return to a central position of the force/distance air spring characteristic since friction forces within the suspension device as a whole are greater than a restoring force within the force/distance air spring characteristic. On the other hand, when the suspension device is designed in such a way that the restoring force is greater—i.e. a greater gradient of the air spring characteristic is set—relatively hard damping is achieved both in the middle stroke range and in the end stroke ranges of the air spring. Furthermore, when using an air spring with a small gradient, there is a high risk that the end stops in the stroke end regions of the air spring will be reached in the event of pronounced expanding and contracting movements caused by a considerable unevenness, which results in a reduced seating comfort for the user of the vehicle seat.

The abovementioned suspension systems have in common the fact that they are usually used for vehicle seats as suspension systems which can be actively influenced. The function of these suspension systems is usually considered independently of the function of any additionally present suspension of the vehicle cab. Therefore, only a vibration acting on the vehicle seat, caused either by the spring-mounted vehicle cab or by the vehicle frame, is taken into consideration in order to bring about a reaction in the suspension system of the vehicle seat for the optimal suspension of the vehicle seat. On the other hand, however, an active control of the suspension movement of the utility vehicle cab as a function of the actively influenced suspension movement of the vehicle seat taking account of the excursion of the vehicle frame does not take place. Instead, one combination which is often used is a passively controlled suspension movement of the vehicle cab, which does not provide for the switching on and off of additional volumes but rather uses for example only an intrinsically closed air spring, with an actively controlled suspension movement of the vehicle seat, which may take place for example by means of an additional volume. This disadvantageously results in the high probability that either the spring element of the vehicle cab or the spring element of the vehicle seat or both reach their end stop regions when a considerable excursion of the vehicle frame takes place when travelling over a pothole. It is also found inter alia that, for subsequent spring movements, in some circumstances the full spring travel of the spring elements of the vehicle seat and/or of the vehicle cab and/or possibly of damping elements provided instead or in addition is no longer available.

SUMMARY

Accordingly, the object of the present invention is to provide a vehicle and also a method in which both a spring-mounted vehicle cab and a spring-mounted vehicle seat perform optimal suspension using the available spring travels and cause a very small excursion movement of the vehicle seat even in the event of a considerable excursion acting on the vehicle from outside.

This object is achieved in device terms by the features of claim 1 and in method terms by the features of claim 10.

One essential point of the invention lies in the fact that, in a vehicle comprising a spring-mounted vehicle seat in a spring-mounted vehicle cab, in which the vehicle seat is spring-mounted by means of at least one first spring element and/or first damping element relative to the vehicle cab in the vehicle height and/or vehicle length and/or vehicle width direction, and in which the vehicle cab is spring-mounted by means of at least one second spring element and/or second damping element relative to a vehicle frame in the vehicle height and/or vehicle length and/or vehicle width direction, a control device is provided which, as a function of a first measured acceleration value of an excursion of the vehicle frame, causes a first application of force for regulating the excursion of the first spring element and/or damping element and a second application of force for regulating the excursion of the second spring element and/or damping element, in mutual dependence on one another.

By taking mutual account of the first and second application of force by means of the control device when an excursion of the vehicle frame takes place, as may take place for example when travelling over a pothole, the situation is advantageously achieved whereby both the suspension systems, i.e. both the suspension system of the vehicle seat and the suspension system of the utility vehicle cab, can be actively controlled in mutual dependence on one another in such a way that end stops of the suspension systems are not reached. Instead, in the event of such a pronounced excursion of the vehicle frame relative to the vehicle seat and the vehicle cab, an active counter-control can take place, i.e. an application of force both of the first and of the second spring element and/or of the first or second damping element at the same time or in a temporally offset manner, so that an increased counter-force is provided to the excursion force of the excursion caused by the vehicle frame. As a result, not only are the end stops of the spring elements or damping elements not reached, but also a very still position of the vehicle seat is achieved as a result of the additional active control of the suspension system of the vehicle cab even in the case of a pronounced excursion acting on the vehicle frame from below. As a result, the driver using the vehicle seat sits very still in his vehicle seat when travelling over very uneven roads, as is the case for example with tractors which are used off-road.

According to one preferred embodiment, the control device is designed in such a way that it causes the first and the second application of force in mutual dependence on one another in such a way that a temporal change in position of the vehicle seat is small. This may take place in that the acceleration acting on the vehicle frame is measured and, with a very short time delay of for example 5 to 500 milliseconds, preferably 100 to 200 milliseconds, particular preferably 140 milliseconds, a counter-force is generated both in the first and in the second spring element, and accordingly both in the suspension system of the vehicle seat and in the suspension system of the utility vehicle cab.

Furthermore, according to one preferred embodiment, the control device causes the first and the second application of force in mutual dependence on one another in such a way that, in the event of an excursion of the vehicle frame, a residual spring travel of the first spring element and/or damping element and of the second spring element and/or damping element that exists in relation to an available spring travel and/or an available damping travel is available in both directions of travel. This may be achieved for example in that, in the case of an excursion of the vehicle frame acting in the upward direction from below, as is the case when travelling over a pothole, a counter-force acting in the downward direction from above is generated both in the first spring element of the vehicle seat and in the second spring element of the vehicle cab simultaneously with identical or different values, in order thus to avoid the situation whereby either the first spring element or the second spring element has to compensate the full excursion acting on the vehicle frame and whereby the first spring element or the second spring element would thus reach an end stop.

In order to measure the acceleration acting on the vehicle frame, at least one first acceleration sensor for measuring the at least one first acceleration value is fitted on the vehicle frame, said first acceleration sensor preferably measuring in three dimensions. This acceleration sensor may measure accelerations not only in the height direction but rather—if designed for this purpose—also in the vehicle length direction and in the vehicle width direction, in order thereby to cause, where necessary, applications of force in opposite directions both in the suspension system of the vehicle seat and in the suspension system of the vehicle cab.

Moreover, preferably at least one second acceleration sensor for measuring at least one second acceleration value of an acceleration of the vehicle cab is provided, said second acceleration sensor being fitted on the vehicle cab and preferably measuring in three dimensions. This makes it possible for the acceleration values which act on the vehicle cab due to the effect of the excursion of the vehicle frame and which thus cause an acceleration of the vehicle cab additionally to be taken into account in the control device, in order to generate a corresponding counter-force or application of force of the vehicle cab and also in particular of the vehicle seat.

At least one first position sensor for measuring the current position of the vehicle cab relative to the vehicle frame, said first position sensor being fitted on the vehicle cab, is provided in order to determine and to measure the current position of the vehicle cab before, during and after the excursion of the vehicle frame has taken place, including with regard to the zero position of the spring element provided for the vehicle cab.

The second acceleration sensor may be used in particular for measuring the subsequent vibration acceleration, i.e. the vibration which takes place after the initial acceleration has taken place, in order to measure a subsequent bounce of the vehicle cab and to allow it to abate as quickly as possible by means of a counter-force in the suspension system.

At least one further, second position sensor fitted on the vehicle seat is provided for measuring the current position of the vehicle seat relative to the vehicle cab and/or the vehicle frame, in order thereby in turn to determine the position of the vehicle seat relative to a zero position of the first spring element or suspension system of the vehicle seat and thus to provide the control device with the necessary information for ensuring where necessary in the spring element a sufficiently large upper and lower residual spring travel in the event of a height adjustment or height excursion of the vehicle seat.

All the acceleration sensors and position sensors are connected by means of control lines to the control device and convey data to the control device.

The control device is connected via regulating valves to additional volumes for switching on and/or switching off additional volumes to the first and second spring elements by means of second control lines, said first and second spring elements being designed in each case as air springs, so that control signals can be output by the control device to the regulating valves. This serves to generate the application of force or counter-force once the initial vibration has taken place on the vehicle frame.

A method for the suspension of a vehicle comprising a spring-mounted vehicle seat and a spring-mounted vehicle cab advantageously allows the active compensation, carried out by means of the components specified above, of vibrations which act on the vehicle frame, by means of the first and second spring elements and/or first and second damping elements, which may also appear in combination. Of course, one or more of the first and second spring elements and first and second damping elements may also be passively regulated, i.e. not influenced by an additional volume.

Further advantageous embodiments will emerge from the dependent claims.

Advantages and expedient features can be found in the following description in conjunction with the drawing, in which:

BRIEF DESCRIPTION OF THE DRAWINGS

FIG. 3 shows a diagram of the vibrations carried out by the various components of the vehicle according to the invention, according to the method of the invention.

DETAILED DESCRIPTION OF THE INVENTION

Figure 1:
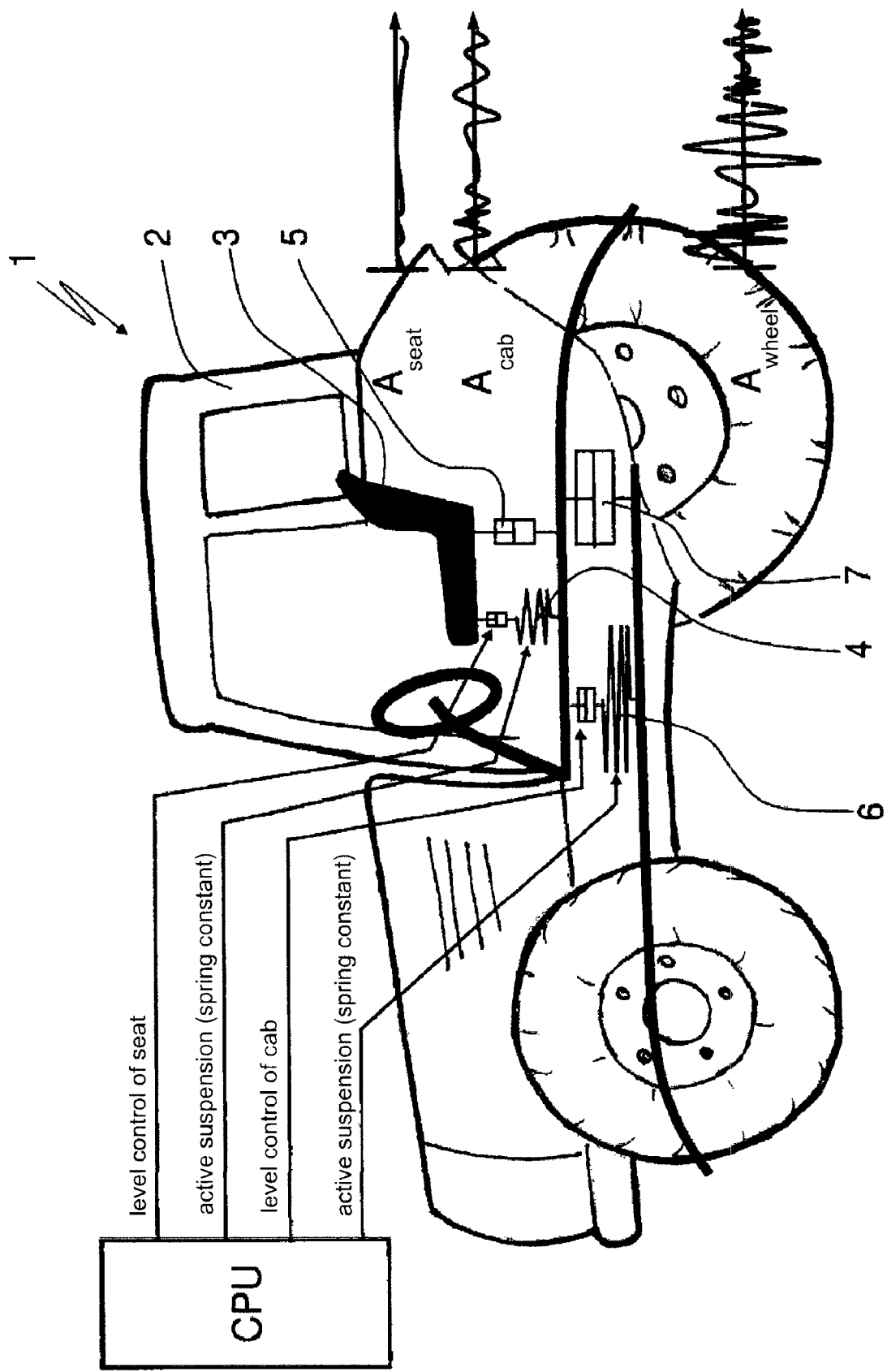
FIG. 1 shows a schematic view of a utility vehicle with a spring-mounted utility vehicle cab and a spring-mounted vehicle seat.

FIG. 1 shows a schematic view of a tractor 1 as a utility vehicle comprising a utility vehicle cab 2 and a vehicle seat 3. Both the utility vehicle cab 2 and the vehicle seat 3 are spring-mounted by means of an air spring and a damping element 4, 5 and 6, 7 respectively, wherein the utility vehicle cab is spring-mounted relative to the rest of the vehicle and the vehicle seat is spring-mounted relative to the utility vehicle cab 2.

Figure 2:
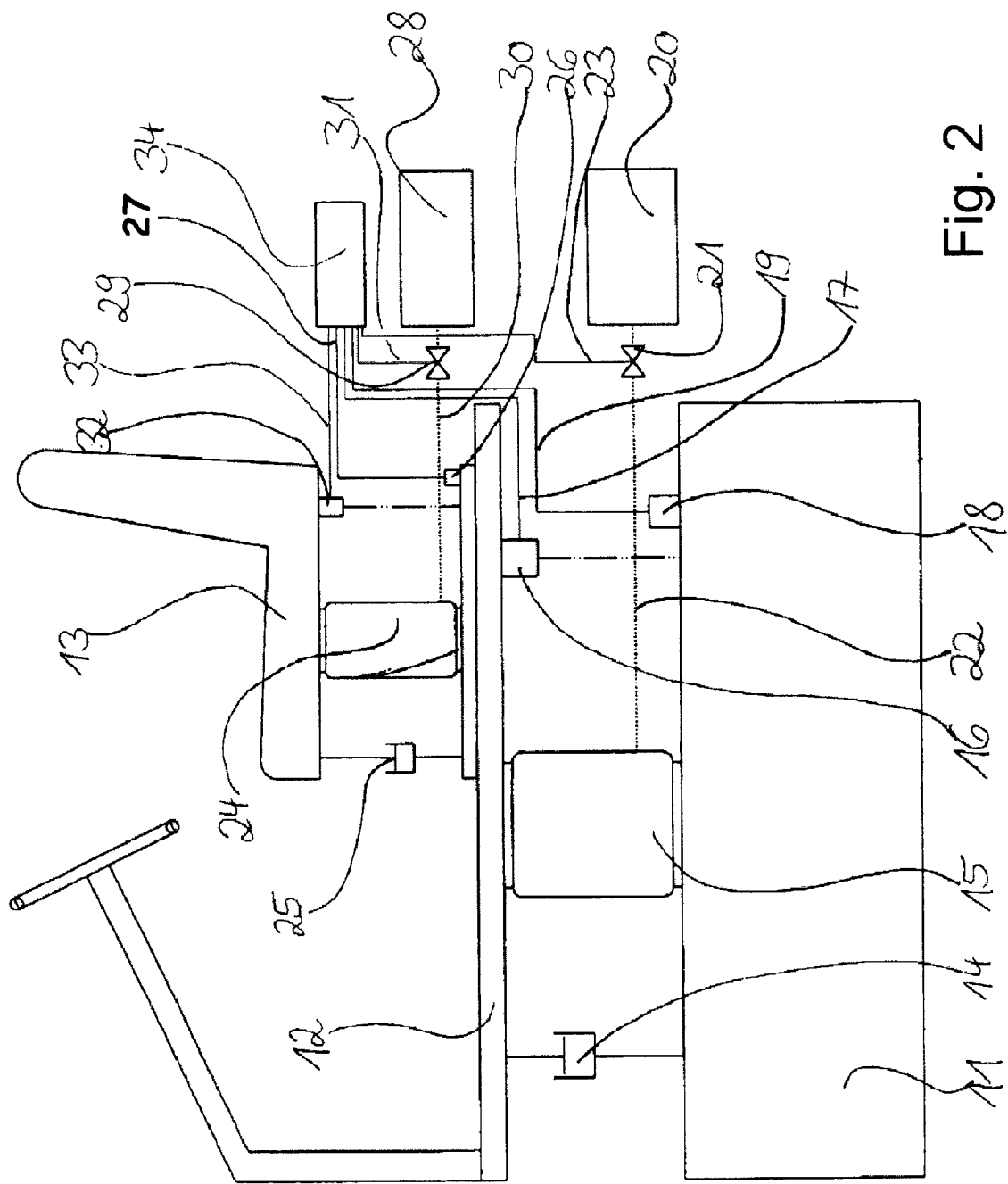
FIG. 2 shows a schematic view of part of a utility vehicle with an indicated vehicle frame, a vehicle cab and a vehicle seat according to one embodiment of the invention.

FIG. 2 shows a schematic view of part of the vehicle according to the invention with an indicated vehicle frame of a vehicle cab and a vehicle seat according to one embodiment of the invention.

The vehicle frame 11 is spring-mounted in a damping manner with respect to a floor 12 of a vehicle cab by means of an air spring 15 and a damping element 14. The vehicle seat 13 is spring-mounted in a damping manner with respect to the floor 12 of the vehicle cab by means of a further air spring 24 and a further damping element 25.

Fitted on the vehicle frame 11 is a first acceleration sensor 18, the control line 19 of which transmits to a control device 34 for transmitting control data and/or acceleration values, but also values regarding the distance travelled by the vehicle frame and optionally the distance from the zero position.

A further acceleration sensor 26 is also arranged on the floor 12 of the vehicle cab, which further acceleration sensor can likewise transmit to the control device 34 by means of a control line 27.

First and second position sensors 16 and 32 are arranged on the underside of the vehicle seat 13 and the underside of the floor 12 of the vehicle cab and can convey position data, preferably regarding the current height excursion, via control lines 17 and 33 to the control device 34.

As soon as the acceleration sensor 18 experiences an acceleration value by virtue of an excursion in the upward direction as a result of travelling over a pothole, it transmits the acceleration value by means of control line 19 to the control device 34. The control device 34 calculates within an extremely short period of time an excursion that is presumably to be expected of the vehicle seat 13 and the utility vehicle cab with the floor 12 and actuates regulating valves 29 and 21 by means of control lines 31 and 23 in order to convey additional volumes from additional volume tanks 20 and 28 by means of air lines 30 and 22 to the air springs 15 and 24. This has the result that the air springs are acted upon by a counter-force in order to prevent an upward swing of the vehicle seat and of the vehicle cab and to thereby achieve a largely smooth constancy of the current height orientation of the vehicle seat 13.

The first position sensor 16 serves, after the initial excursion of the vehicle frame has taken place, which has acted on the vehicle cab, for measuring subsequent vibrations of the vehicle cab and for conveying this information via the control line 17 to the control device 34, so that the latter can generate a corresponding spring force in the opposite direction by actuating the regulating valve 21 by means of the control line 23 and switching on or off the additional volume 20 to the spring element or the air spring 15 in order to compensate the subsequent vibration.

Of course, all the acceleration sensors are also conceivable as sensors which operate three-dimensionally, so that a force application to the spring elements 15, 24, optionally also in the three-dimensional direction, can counteract even vibrations which take place not only in the height direction but rather also in the length direction and width direction of the vehicle.

In FIG. 3, a plurality of vibrations are shown in a diagram, wherein the acceleration values acting on the system are shown on the ordinate and the time is shown on the abscissa.

As can be seen from the diagram, an initial vibration caused by an excursion of the vehicle frame, also known as the excitation vibration, takes place as a result of an acceleration movement of the vehicle as a whole, for example in the height direction. This is shown as the top line.

Such an acceleration vibration acting on the vehicle frame in turn results in a cab excursion which is shown as the second line.

The acceleration movement of the cab is shown as the third vibration movement.

The fourth line represents the excursion movement of the seat suspension or vehicle seat, wherein this movement takes place with an almost 180° phase shift relative to the cab excursion, which in turn has an almost 180° phase shift relative to the acceleration movement of the vehicle frame.

As a result, due to the vibrations of the cab acceleration and of the vehicle acceleration taking place in a complementary manner, a very smooth seat movement and thus a relatively constant seat position of the vehicle seat is obtained. This is shown as the fifth line.

The sixth and seventh lines represent the regulating signals which are accordingly required in order to regulate the spring elements of the vehicle cab and of the vehicle seat and which, in reaction to the excursion of the vehicle frame that has taken place, are sent from the control device to the regulating valves in order to switch the additional volumes on and off.

All the features disclosed in the application documents are claimed as essential to the invention in so far as they are novel individually or in combination with respect to the prior art.

| KEY TO FIGURES | |
| --- | --- |
| GERMAN | ENGLISH |
| Niveausteuerung Sitz | level control of seat |
| Aktive Federung (Federkonstante) | active suspension (spring constant) |
| Niveausteuerung Kabine | level control of cab |
| Aktive Federung (Federkonstante) | active suspension (spring constant) |
| Sitz | seat |
| Kabine | cab |
| Rad | wheel |
| Kabinen- und Sitzfederung im Verbund | cab and seat suspension in combination |
| Beschleunigung Fahrzeug (Anregung) | acceleration of vehicle (excitation) |
| Kabinenauslenkung | cab excursion |
| Beschleunigung Kabine | acceleration of cab |
| Auslenkung Sitzfederung | excursion of seat suspension |
| relative Sitzposition | relative seat position |
| Regelzustand Kabinenfederung | state of regulation of cab suspension |
| Regelzustand Sitzfederung | state of regulation of seat suspension |
| Zeit | time |

What is claimed is:

1. A vehicle comprising:
   a vehicle frame;
   a spring-mounted vehicle cab;
   a spring-mounted vehicle seat in the spring-mounted vehicle cab, wherein the vehicle seat is spring-mounted by means of at least one first spring element or one first damping element relative to the vehicle cab in at least one of the vehicle height, vehicle length or vehicle width direction;
   at least one second spring element or second damping element for spring-mounting the vehicle cab relative to the vehicle frame in at least one of the vehicle height, vehicle length or vehicle width direction; and
   a control device, wherein as a function of a first measured acceleration value of an excursion of the vehicle frame, causes a first application of force for regulating the excursion of at least one of the first spring element or damping element and causes a second application of force for regulating the excursion of at least one of the second spring element or damping element, in mutual dependence on one another based on a second measured acceleration value of an excursion of the vehicle frame, wherein the control device is configured to calculate an excursion that is presumably to be expected of the vehicle seat and the utility vehicle cab with a floor to generate a counter-force both in the first spring element or first damping element of the vehicle seat and in the second spring element or second damping element of the vehicle cab simultaneously with identical or different values.

2. The vehicle according to claim 1, wherein the control device causes the first and the second application of force in mutual dependence on one another in such a way that a temporal change in position of the vehicle seat is small.

3. The vehicle according to claim 1, wherein the control device causes the first and the second application of force in mutual dependence on one another in such a way that, in the event of an excursion of the vehicle frame, a residual spring travel of the at least one first spring element or first damping element and of the at least one second spring element or second damping element is available in both directions of travel whereby neither the at least one first spring element or first damping element or the at least one second spring element or second damping element has to solely compensate for the excursion and reach its end stop.

4. The vehicle according to claim 1, further comprising at least one first acceleration sensor connected to the control device for measuring the first acceleration value, said first acceleration sensor being fitted on the vehicle frame and preferably measuring in three dimensions.

5. The vehicle according to claim 4, further comprising at least one second acceleration sensor connected to the control device for measuring the second acceleration value of an acceleration of the vehicle cab, said second acceleration sensor being fitted on the vehicle cab and preferably measuring in three dimensions.

6. The vehicle according to claim 1, further comprising at least one first position sensor connected to the control device for measuring a current position of the vehicle cab relative to the vehicle frame, said first position sensor being fitted on the vehicle cab.

7. The vehicle according to claim 6, further comprising at least one second position sensor connected to the control device for measuring a current position of the vehicle seat relative to the vehicle cab or the vehicle frame, said second position sensor being fitted on the vehicle seat.

8. The vehicle according to claim 4, wherein the at least one first acceleration sensor is connected by means of control lines to the control device.

9. The vehicle according to claim 1, further comprising volume elements in signal communication with the control device for switching on or off one or more volumes to the first or second spring elements, said first or second spring elements being designed in each case as air springs.

10. The vehicle according to one of the claim 5, wherein the acceleration sensors are connected by means of control lines to the control device.

11. A method for the suspension of a vehicle seat in a spring-mounted vehicle cab, wherein:
spring mounting the vehicle seat by means of at least one first spring element or first damping element relative to the vehicle cab in at least one of the vehicle height, vehicle length or vehicle width direction;
spring mounting the vehicle cab by means of at least one second spring element or second damping element relative to a vehicle frame in at least one of the vehicle height, vehicle length or vehicle width direction;
sensing a first acceleration value of an excursion of the vehicle frame;
sensing a second acceleration value of the excursion of the vehicle frame;
regulating a first excursion of the at least one first spring element or first damping element according to the sensed first acceleration value; and
regulating a second excursion of the at least one second spring element or second damping element according to the sensed second acceleration value, wherein a control device calculates an excursion that is presumably to be expected of the vehicle seat and the utility vehicle cab with a floor to generate a counter-force both in the first spring element or first damping element of the vehicle seat and in the second spring element or second damping element of the vehicle cab simultaneously with identical or different values.

12. The method according to claim 11, wherein regulating the first excursion comprises applying a first application of force.

13. The method according to claim 11, wherein regulating the second excursion comprises applying a second application of force.

14. The method according to claim 12, wherein application of the first and second forces are in mutual dependence on one another in such a way that a temporal change in position of the vehicle is small.

* * * * *